(12) United States Patent
O'Cull et al.

(10) Patent No.: US 7,921,026 B2
(45) Date of Patent: Apr. 5, 2011

(54) METHOD AND SYSTEM FOR GENERATING A TIMELINE ASSOCIATED WITH A PROJECT SCHEDULE

(75) Inventors: Heather J. O'Cull, Kirkland, WA (US); Alexander A. Sourov, Seattle, WA (US); Rahul N. Motwani, Redmond, WA (US); Daniil Magdalin, Redmond, WA (US); Lawrence D. Boyes, Seattle, WA (US); Kyle D. Power, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1223 days.

(21) Appl. No.: 11/070,691

(22) Filed: Mar. 1, 2005

(65) Prior Publication Data
US 2006/0200372 A1 Sep. 7, 2006

(51) Int. Cl.
*G06F 9/44* (2006.01)
*G06F 17/50* (2006.01)
(52) U.S. Cl. ..................................................... 705/7.23
(58) Field of Classification Search .................... 705/7, 8
See application file for complete search history.

(56) References Cited

U.S. PATENT DOCUMENTS

| | | | | | |
|---|---|---|---|---|---|
| 5,414,809 | A | * | 5/1995 | Hogan et al. | 715/765 |
| 5,659,768 | A | * | 8/1997 | Forbes et al. | 715/201 |
| 5,745,110 | A | * | 4/1998 | Ertemalp | 715/764 |
| 7,058,660 | B2 | * | 6/2006 | Scott | 707/104.1 |
| 7,068,288 | B1 | * | 6/2006 | Good et al. | 345/619 |
| 7,688,322 | B2 | * | 3/2010 | Kapler et al. | 345/440 |
| 2003/0018242 | A1 | * | 1/2003 | Hursh et al. | 600/300 |
| 2003/0137540 | A1 | * | 7/2003 | Klevenz et al. | 345/762 |
| 2004/0268270 | A1 | * | 12/2004 | Hill et al. | 715/963 |
| 2006/0044307 | A1 | * | 3/2006 | Song | 345/419 |

OTHER PUBLICATIONS

Teresa Stover, Microsoft Office Project 2003 Inside Out, Appendix A, Microsoft Press, Oct. 1, 2003.*
Teresa Stover, Microsoft Office Project 2003 Inside Out, Chap 10, pp. 308-326, Microsoft Press, Oct. 1, 2003.*
Teresa Stover, Microsoft Office Project 2003 Inside Out, Chap 23, pp. 703-706, Microsoft Press, Oct. 1, 2003.*
Teresa Stover, Microsoft Office Project 2003 Inside Out, Chap 6, Microsoft Press, Oct. 1, 2003.*
Teresa Stover, Microsoft Office Project 2003 Inside Out, Chap 5, pp. 165-166, Microsoft Press, Oct. 1, 2003.*
Teresa Stover, Microsoft Office Project 2003 Inside Out, Chap 4, pp. 95-122, Microsoft Press, Oct. 1, 2003.*
Teresa Stover, Microsoft Office Project 2003 Inside Out, Chap 4, pp. 123-131, Microsoft Press, Oct. 1, 2003.*
Teresa Stover, Microsoft Office Project 2003 Inside Out, Chap 25, pp. 799-805, Microsoft Press, Oct. 1, 2003.*
Teresa Stover, Microsoft Office Project 2003 Inside Out, Chap 3, pp. 83-85, Microsoft Press, Oct. 1, 2003.*
Teresa Stover, Microsoft Office Project 2003 Inside Out, Chap 25, pp. 761-784, Microsoft Press, Oct. 1, 2003.*
Teresa Stover, Microsoft Office Project 2003 Inside Out, Chap 5, pp. 167-168, Microsoft Press, Oct. 1, 2003.*
Teresa Stover, Microsoft Office Project 2003 Inside Out, Chap 5, Table of Contents, Microsoft Press, Oct. 1, 2003.*
Teresa Stover, Microsoft Office Project 2003 Inside Out, Chap 4, pp. 327-337, Microsoft Press, Oct. 1, 2003.*
North, C., and Shneiderman, B. "A Taxonomy of Multiple Window Coordinations." Univ. Maryland Computer Science Dept. Technical Report #CS-TR-3854, 1997.*
Teresa Stover, Microsoft Office Project 2003 Inside Out, Microsoft Press, Oct. 1, 2003.*
Teresa Stover, Microsoft Office Project 2003 Inside Out, Microsoft Press, Oct. 1, 2003. pp. 440 and 745.*

* cited by examiner

*Primary Examiner* — Beth V Boswell
*Assistant Examiner* — Folashade Anderson
(74) *Attorney, Agent, or Firm* — Merchant & Gould

(57) ABSTRACT

A timeline is generated from and fully integrated with a project schedule. The project schedule may be any graphical representation for displaying detailed information associated with a project. The timeline visually represents certain tasks, dates and other information associated with the project schedule such that an overview of the project schedule may be determined.

18 Claims, 3 Drawing Sheets

US 7,921,026 B2

METHOD AND SYSTEM FOR GENERATING A TIMELINE ASSOCIATED WITH A PROJECT SCHEDULE

BACKGROUND

A project management application manages tasks associated with a project. A project management application program allows a user to define project goals, plan tasks and resources, schedule tasks for completion to achieve a goal, display a project plan, and carry out and manage the project. The project management application program provides many benefits including: automatically calculating the project schedule; automatically updating the project schedule if task information has been changed; analyzing the project schedule to schedule resources and evaluate alternatives; providing schedule output in a standard format which is consistent for all projects; and storing the schedule data for use in future projects.

A project management schedule is composed of tasks. The schedule defines the sequence in which the tasks occur, the resources needed to complete the task, and calendar information associated with the tasks. Each task is defined to include information associated with the start and finish date and time, the percentage of work completed, the required resources, projected and actual costs, etc.

Project schedules containing task information may be displayed using a Gantt Chart. The Gantt Chart is named after Henry L. Gantt who first used a bar chart to graphically plot tasks on a timescale to indicate the start and finish dates of a task. A Gantt Chart typically shows a list of tasks on the left side of a display, and a bar chart on the right side of the display. The bar chart graphically shows the task information on a timescale defined by the user such that a lot of detailed task information may be examined and compared. However, the bar chart of detailed task information does not provide a high level overview of the project schedule.

SUMMARY

The present disclosure is directed to a method and system for generating a timeline associated with a project schedule. The project schedule may be any graphical representation for displaying detailed information associated with a project. The project schedule includes detailed information (e.g., tasks assigned to dates). The timeline is generated from and fully integrated with the project schedule. The timeline visually represents certain tasks such that an overview of the project schedule may be determined.

The timeline displays certain tasks based on user-selected or user-defined parameters to filter the project schedule tasks. The timeline is integrated with the project schedule such that the tasks may be filtered based on characteristics defined in the project schedule. The project schedule and the timeline are synchronized such that modifications made to the detailed information associated with the project schedule are automatically implemented in the timeline, and vice versa. Comments may be added to the timeline to provide additional information about the timeline. The comments are objects independent of the project schedule that are linked to the timeline by date.

In accordance with one aspect of the invention, data associated with tasks in a project schedule is received. The data provides detailed information associated with the project schedule. The data is filtered. A timeline is rendered using the filtered data. The timeline indicates dates associated with the filtered data.

DETAILED DESCRIPTION OF THE PREFERRED EMBODIMENTS

The present disclosure is directed to a method and system for generating a timeline associated with a project schedule. The project schedule may be any graphical representation for displaying detailed information associated with a project. The detailed information may include tasks assigned to dates. The timeline is generated from and fully integrated with the project schedule. The timeline visually represents certain tasks such that an overview of the project schedule may be determined.

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
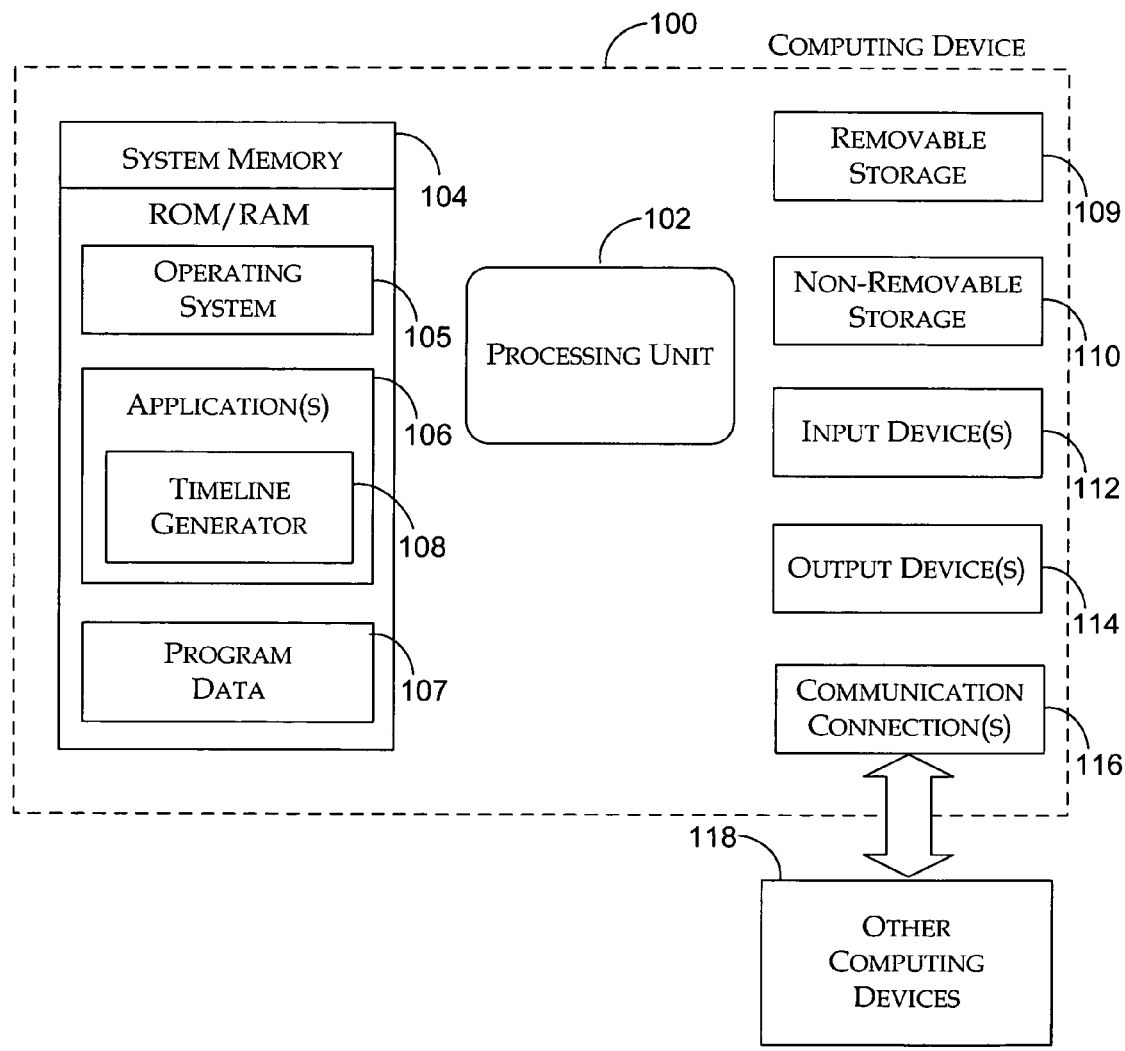
FIG. 1 illustrates a computing device that may be used according to an example embodiment of the present invention.
Figure 2:
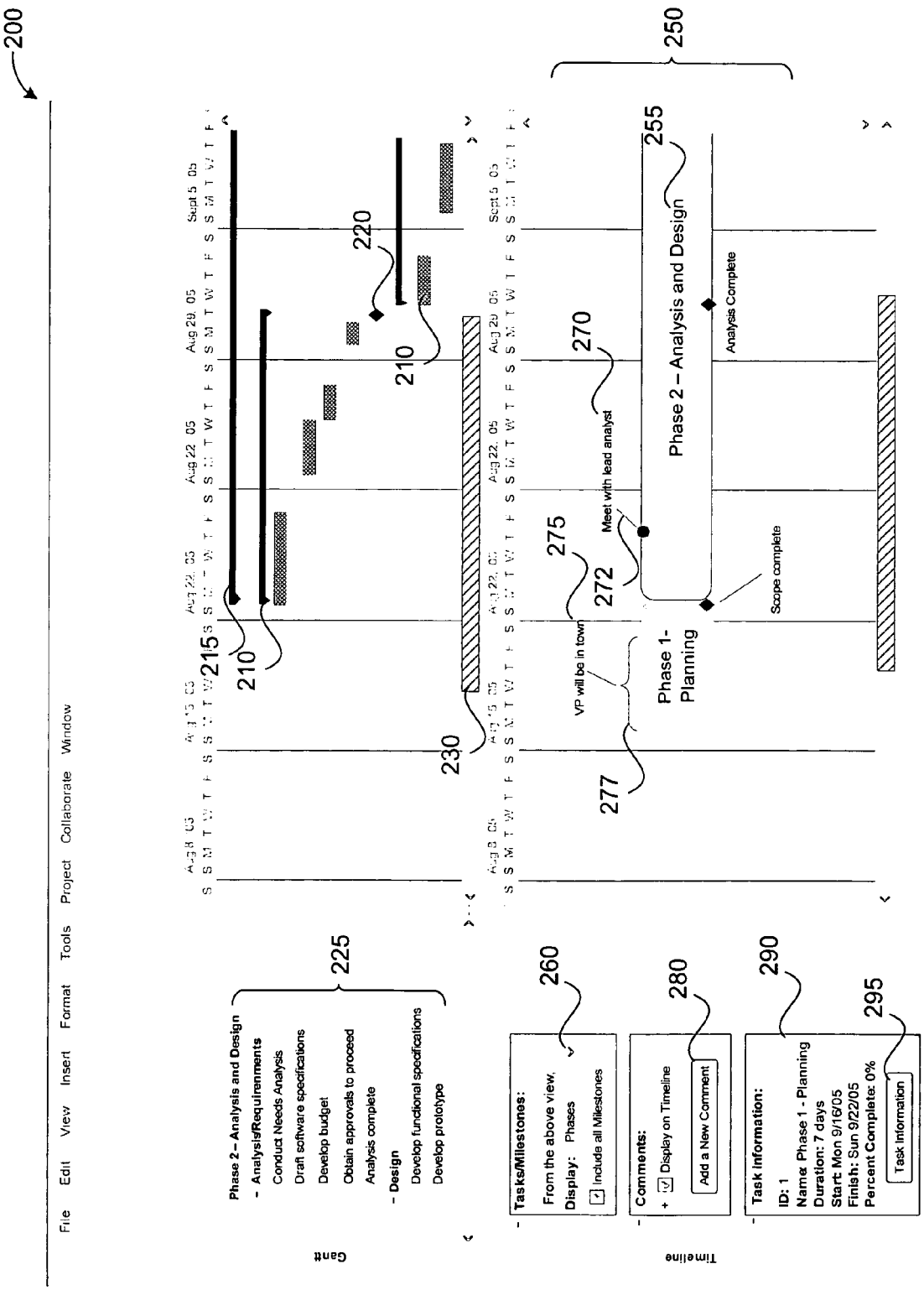
FIG. 2 illustrates a user interface displaying a timeline associated with a project schedule, in accordance with at least one feature of the present invention.
Figure 3:
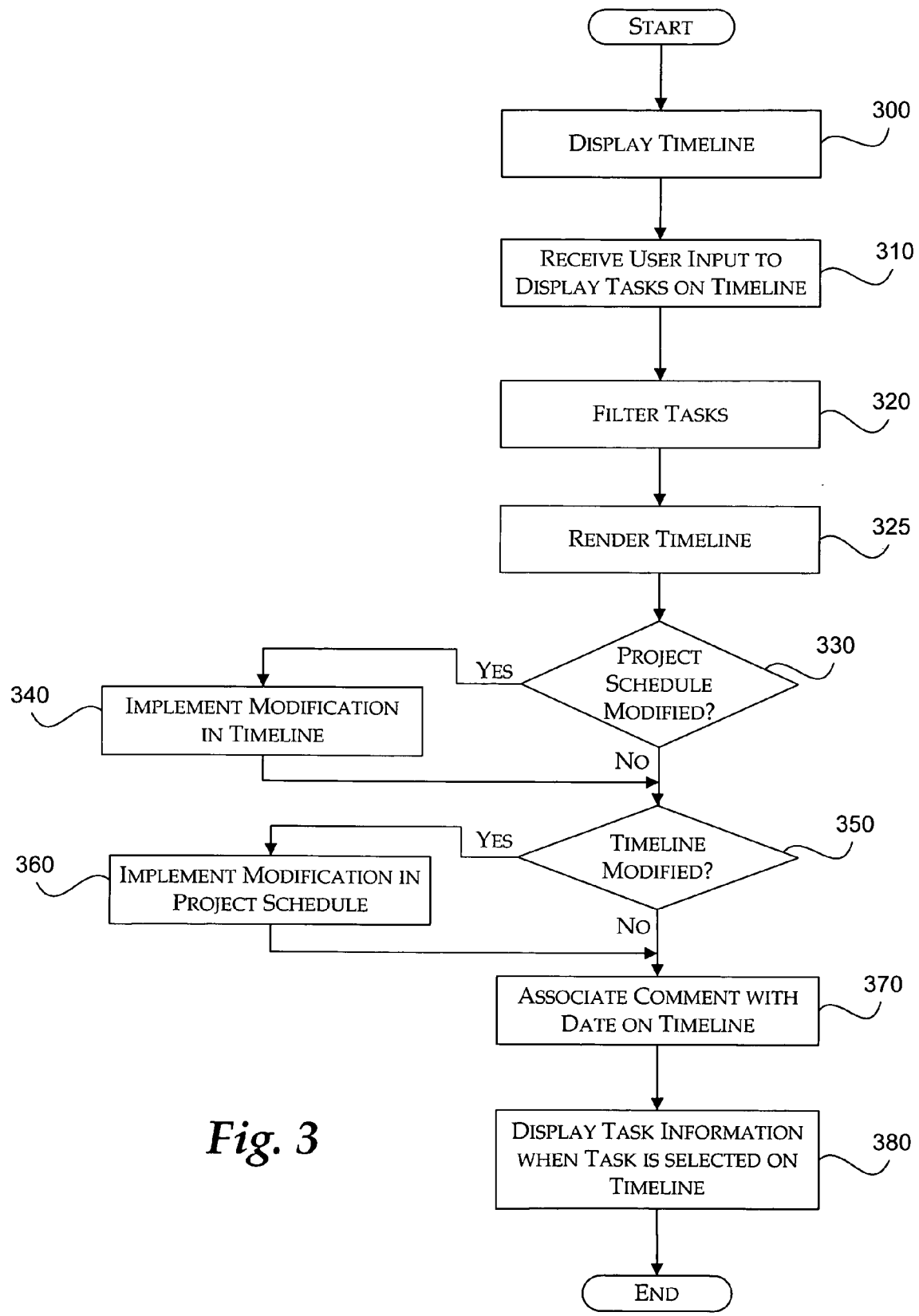
FIG. 3 illustrates an operational flow diagram illustrating a process for generating a timeline associated with a project schedule, in accordance with at least one feature of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A timeline generator 108, which is described in detail below with reference to FIGS. 2 and 3, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Generating a Timeline Associated with a Project Schedule

FIG. 2 illustrates a user interface displaying a timeline associated with a project schedule. The user interface displays project schedule 200. Project schedule 200 includes tasks 210, 215, milestone 220, names 225, scroll bar 230, and timeline 250. Tasks 210, 215 and milestone 220 are arranged to provide detailed information associated with project schedule 200. Timeline 250 includes task overview 255, timeline menu 260, comments 270, 275, comment menu 280, task information menu 290, and task information button 295. Timeline 250 is arranged to provide an overview of project schedule 200. For example, task 215 may be associated with a specific phase of the project schedule referred to as "Phase 2—Analysis and Design." Task 215 corresponds to task overview 255 such that task 215 is represented on timeline 250 as task overview 255.

The user interface may provide a split screen view of project schedule 200. For example, timeline 250 is displayed on a bottom portion of the user interface while the detailed information associated with project schedule 200 (e.g., tasks 210, 215, milestones 220 and names 225) are displayed on a top portion of the user interface. Project schedule 200 may be any graphical representation for displaying detailed information associated with a project. For example, tasks 210, 215 and milestones 220 may be arranged to form a Gantt Chart. Project schedule 200 may be created by assigning tasks 210, 215 and milestone 220 to specific dates or date ranges. Thus, project schedule 200 is dependent on the dates specified for individual tasks 210. Project schedule 200 also includes names 225 associated with phases, tasks and milestones. Throughout this description and in the appended claims, the term "task" is used to describe any information associated with project schedule 200 (e.g., specific project tasks, project phases, milestones, task completion indicators, etc.).

Timeline 250 is generated from and fully integrated with project schedule 200. Timeline 250 visually represents specific information (e.g., selected tasks, major phases, etc.) associated with project schedule 200 such that an overview of project schedule 200 may be determined. The split screen view allows a user to determine how individual tasks fit into the overall project schedule. This feature is useful for project planning. Timeline 250 provides the user with a project overview when the user may be accessing or creating tasks several layers into project schedule 200. In one embodiment, only timeline 250 is displayed on the user interface (i.e., the detailed information associated with project schedule 200 is not displayed).

Timeline 250 is customized to display only the project schedule information desired by a user. The detailed information associated with project schedule 200 (e.g., tasks 210, 215) in project schedule 200 are filtered such that certain tasks are displayed on timeline 250. Timeline 250 is integrated with project schedule 200 such that tasks 210, 215 may be filtered based on characteristics defined in project schedule 200. In one embodiment, the user selects parameters for determining which project schedule information is displayed on timeline 250 using timeline menu 260. For example, the user may select from parameters that display all tasks, all phases, top level tasks, critical tasks, summary tasks, completed tasks, uninitiated tasks, tasks in progress, tasks associated with a particular user, etc. In the example shown in the figure, all phases are selected for display on timeline 250. In another embodiment, the user may define a parameter that filters the project schedule information for a specific purpose. In yet another embodiment, multiple parameters may be used to filter to tasks 210, 215. For example, a filter for a first parameter may be applied to tasks 210, 215 such that only top level tasks are displayed on timeline 250. Another parameter that filters tasks assigned to a particular user may be applied on top of the first parameter. The result is that top level tasks assigned to the particular user are displayed on timeline 250.

Project schedule 200 and timeline 250 are synchronized such that modifications made to the detailed information associated with project schedule 200 (e.g., tasks 210, 215 and milestone 220) are automatically implemented in timeline 250, and vice versa. For example, a user may extend the end date of a task. The date extension is automatically applied to the corresponding task in timeline 250. In another example, a new task may be added to timeline 250. The new task is automatically implemented in the detailed information associated with project schedule 200. The user may then access the newly added task in the detailed information to add more specific information associated with the new task. In one embodiment, a new task may be inserted in project schedule 200 using a task menu. The user may then enter information associated with the new task. In another embodiment, the time scale of the detailed information associated with project schedule 200 directly corresponds to the time scale of timeline 250 such that the detailed information associated with project schedule 200 and timeline 250 remain in the same time frame. For example, when the detailed information associated with project schedule 200 is scrolled using scroll bar 230 timeline 250 is also scrolled by the same amount, and vice versa. In yet another embodiment, a modification to a zoom level associated with timeline 250 is reflected on project schedule 200 such that the detailed information associated with project schedule 200 is associated with the same zoom level.

Comments 270, 275 may be added to timeline 250 using comment menu 280. Comments 270, 275 provide additional information associated with timeline 250. For example, a user may insert a comment that an outside influence may delay the completion of a task (e.g., "VP will be in town"). Comments 270, 275 are objects that are independent of tasks 210, 215. Comments 270, 275 are linked to timeline 250 at a particular date or date range. In one embodiment, comment 270 is associated with a specific date, as indicated by line 272. In another embodiment, comment 275 is associated with a range of dates, as indicated by bracket 277. Comments 270, 275 may be associated with a particular audience such that the user may determine which comments are displayed to the audience. In other words, some comments may be hidden for non-audience members who access timeline 250. For example, some or all of the comments may appear only on timeline versions accessed by upper level executives. In one embodiment, comments 270, 275 may be moved on timeline 250 (e.g., the user clicks and drags the comment) because comments 270, 275 are independent of project schedule 200. When a comment is moved on timeline 250 the corresponding date/date range remains the same.

A user may select a task (e.g., Phase 1) on timeline 250 by positioning a cursor on timeline 250 and clicking a mouse button. Task information is displayed in task information window 290 when the task is selected on timeline 250. The task information provides additional information associated with the selected task. For example, a user may select Phase 1 on timeline 250. More information associated with Phase 1 is presented in task information window 290. In one embodiment, the task information may be modified by selecting task information button 295.

The user may select the next task on timeline 250 by depressing the right arrow key on a keyboard. In one embodiment, the tasks may overlap. For example, Phase 3 may be scheduled to begin after Phase 2 begins and to end before Phase 2 ends. If Phase 2 is selected, Phase 3 is not visible to the user. If a user depresses the right arrow key when Phase 2 is selected, Phase 3 is selected and becomes visible (e.g., the Phase 3 image is moved to the front of timeline 250).

In one embodiment, the user may change the appearance of timeline 250. For example, text associated with two milestones may overlap. The user may click and drag the text associated with one of the milestones such that the text is readable. In another embodiment, conditional formatting may be performed to visually distinguish the tasks on timeline 250. For example, the user may associate certain tasks with a particular color (e.g., completed tasks are shown in green, delayed tasks are shown in red).

FIG. 3 illustrates an operational flow diagram illustrating a process for generating a timeline associated with a project schedule. The process begins at a start block where a project schedule is created for a project. The project schedule includes detailed information about the project (e.g., tasks assigned to dates). The project schedule may be displayed on a user interface.

A timeline associated with the project schedule is displayed on the user interface at block 300. The timeline visually represents certain tasks to provide an overview of the project schedule. The timeline may be displayed in response to a user input. In one embodiment, the timeline defaults to display top level tasks. In another embodiment, the timeline and the detailed information associated with the project schedule are displayed in a split screen view on the user interface.

Proceeding to block 310, user input to display certain tasks on the timeline is received. The user input includes a parameter for filtering the tasks. In one embodiment, the tasks to be displayed may be selected from a menu. For example, the user may select all tasks, completed tasks, or tasks assigned to be completed by a particular person. In another embodiment, the user may customize the parameter.

Advancing to block 320, the tasks in the project schedule are filtered based on the parameter. The timeline is integrated with the project schedule such that the tasks may be filtered based on characteristics defined in the project schedule. In one embodiment, the tasks may be filtered in accordance with more than one parameter. The timeline is then rendered with the filtered tasks at block 325.

Transitioning to decision block 330, a determination is made whether the detailed information associated with the project schedule has been modified. A user may modify the detailed information associated with the project schedule in a variety of different ways. For example, the user may extend the completion date of a task, add a new task, scroll the project schedule using a scroll bar, change the zoom level associated with the detailed information associated with the project schedule, changing a property associated with the detailed information associated with the property schedule, etc. If the detailed information associated with the project schedule has not been modified, processing continues at decision block 350. If the detailed information associated with the project schedule has been modified, processing continues to block 340 where the modification is automatically implemented in the timeline.

Continuing to decision block 350, a determination is made whether the timeline has been modified. A user may modify the timeline in the same way that the detailed information associated with the project schedule may be modified. If the timeline has not been modified, processing continues at block 370. If the timeline has been modified, processing continues to block 360 where the modification is automatically implemented in the detailed information associated with the project schedule.

Moving to block 370, a comment is associated with a date on the timeline. In one embodiment, the date corresponds to a date range. The comment is user-defined to provide additional information about the timeline. The comment is an object that is independent of the project schedule. Thus, the comment may be moved on the timeline without affecting the project schedule. In one embodiment, the comment is associated with an audience such that the comment is displayed when the timeline is accessed by the a member of the audience.

Proceeding to block 380, information associated with the task is displayed when a task on the timeline is selected. Further processing may then be performed such as printing the timeline or inserting the timeline in a document associated with a different application. Processing then terminates at an end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method executing on a processor of a computing device for simultaneously displaying a first Gantt bar chart window pane and a second Gantt bar chart window pane of a project management application, the computer-implemented method comprising:

generating a project schedule on the project management application, wherein the project schedule includes a first hierarchical level of project phases and a second hierarchical level of tasks subordinate to each of the project phases;

causing a computer processor to populate and display, on a computer display, a first Gantt bar chart window pane, wherein the first Gantt bar chart window pane includes a displayed timeframe, wherein the first Gantt bar chart window pane is populated and displayed with task timeline bars that depict each of the tasks subordinate to each of the project phases, wherein the task timeline bars display spans from a start date to an end date for each task;

receiving a filter request for the first Gantt bar chart window pane, wherein the filter request is a request for a high level abstraction of the first Gantt bar chart window pane;

in response to the filter request, causing the computer processor to display a second Gantt bar chart window pane simultaneously and independently of the display of the first Gantt bar chart window pane, wherein the second Gantt bar chart window pane includes the same displayed timeframe as the first Gantt bar chart window pane, wherein the second Gantt bar chart window pane is displayed with phase timeline bars that depict each of the project phases without depicting the tasks subordinate to the project phases, wherein the phase timeline bars display a span from a display of a start date to a display of an end date for each phase, wherein the display of the start date for the phase timeline bars in the second Gantt bar chart window pane is graphically aligned in the displayed timeframe with a display of an earliest start date for any of the tasks subordinate to the project phase in the first Gantt bar chart window pane, wherein the display of the end date for the phase timeline bars is graphically aligned in the displayed timeframe with a display of a latest end date of any of the tasks subordinate to the project phase in the first Gantt bar chart window pane; and providing a synchronous relationship between the task timeline bars depicted in the first Gantt bar chart window pane and the phase timeline bars depicted in the second Gantt bar chart window pane, wherein a modification to the task timeline bars depicted in the first Gantt bar chart window pane is graphically synchronized to the phase timeline bars depicted in the second Gantt bar chart window pane, wherein a modification to the phase timeline bars depicted in the second Gantt bar chart window pane is graphically synchronized to the task timeline bars depicted in the first Gantt bar chart window pane.

2. The computer-implemented method of claim 1, wherein the project schedule includes a least one milestone date, wherein the at least one milestone date is indicated within the first Gantt bar chart window pane, wherein upon receiving a selection of a milestone option within a user interface of the second Gantt bar chart window pane, indicating the milestone date within the second Gantt bar chart window pane.

3. The computer-implemented method of claim 1, wherein the second Gantt bar chart window pane includes a user interface menu, wherein the user interface menu includes a comments option for inputting text into the second Gantt bar chart window pane independent of any phase timeline bar, wherein upon receiving a comment in the user interface, text of the comment is displayed in the second Gantt bar chart window pane independent of any phase timeline bar.

4. The computer-implemented method of claim 3, wherein the display of the text of the comment is associated with a timeframe indicator, independent of any phase timeline bar, that indicates a span of time associated with the text of the comment within the second Gantt bar chart window pane.

5. The computer-implemented method of claim 3, wherein the display of the text of the comment is associated with a specific time indicator independent of any phase timeline bar, that indicates a point in time associated with the text of the comment within the second Gantt bar chart window pane.

6. The computer-implemented method of claim 1, wherein the first Gantt bar chart window pane is located above the second Gantt bar chart window pane, wherein the first Gantt bar chart window pane and the second Gantt bar chart window pane have corresponding timeframe indicators.

7. A computer-readable medium storing a computer program having instructions thereon for instructing a computer to simultaneously display a first Gantt bar chart window pane and a second Gantt bar chart window pane of a project management application, the computer being instructed to perform the steps comprising:

generating a project schedule on the project management application, wherein the project schedule includes a first hierarchical level of project phases and second hierarchical level of tasks subordinate to each of the project phases;

populating and displaying a first Gantt bar chart window pane, wherein the first Gantt bar chart window includes a timeframe, wherein the first Gantt bar chart window is populated and displayed with task timeline bars that depict each of the tasks subordinate to each of the project phases, wherein the task timeline bars display spans from a start date to an end date for each task;

in response to a filter request, simultaneously displaying an independent second Gantt bar chart window pane, wherein the second Gantt bar chart window pane includes the same timeframe as the first Gantt bar chart window pane, wherein the second Gantt bar chart window pane is displayed with phase timeline bars that display each of the project phases without depicting the tasks subordinate to the project phases, wherein the phase timeline bars display a span from a start date to an end date for each phase.

8. The computer-readable storage medium of claim 7, wherein the project schedule includes a least one milestone date, wherein the at least one milestone date is indicated within the first Gantt bar chart window pane, wherein upon receiving a selection of a milestone option within a user interface of the second Gantt bar chart window pane, indicating the milestone date within the second Gantt bar chart window pane.

9. The computer-readable storage medium of claim 7, wherein the second Gantt bar chart window pane includes a user interface, wherein the user interface includes a comments option for inputting text into the second Gantt bar chart window pane independent of any phase timeline bar, wherein upon receiving a comment in the user interface, text of the comment is displayed in the second Gantt bar chart window pane independent of any phase timeline bar.

10. The computer-readable storage medium of claim 9, wherein the display of the text of the comment is associated with a timeframe indicator, independent of any phase timeline bar, that indicates a span of time associated with the text of the comment within the second Gantt bar chart window pane.

11. The computer-readable storage medium of claim 9, wherein the display of the text of the comment is associated with a specific time indicator, independent of any phase timeline bar, that indicates a point in time associated with the text of the comment within the second Gantt bar chart window pane.

12. The computer-readable storage medium of claim 7, wherein the indicator of the start date for a project phase is graphically aligned in the displayed timeframe with a display of an earliest start date for any of the tasks subordinate to the project phase, wherein the indicator of the end date for the project phase is graphically aligned in the displayed timeframe with a display of a latest end date of any of the tasks subordinate to the project phase.

13. The computer-readable storage medium of claim 7, wherein the first Gantt bar chart window pane is located above the second Gantt bar chart window pane, wherein the first Gantt bar chart window pane and the second Gantt bar chart window pane have corresponding timeframe indicators.

14. A system for simultaneously displaying a first bar chart window pane and a second bar chart window pane of a project management application, the system comprising:
   a processor; and
   a memory having computer-executable instruction stored thereon, wherein the computer -executable instructions are configured for:
      generating a project schedule on the project management application, wherein the project schedule includes a first hierarchical level of project phases and second hierarchical level of tasks subordinate to each of the project phases;
      populating and displaying a first bar chart window pane, wherein the first bar chart window includes a timeframe, wherein the first bar chart window is populated and displayed with task timeline bars that depict each of the tasks subordinate to each of the project phases, wherein the task timeline bars indicate spans from a start date to an end date for each task;
      in response to a filter request, simultaneously displaying a second bar chart window pane independent of the first bar chart window pane, wherein the second bar chart window pane includes the same timeframe as the first bar chart window pane, wherein the second bar chart window pane is displayed with phase timeline bars that depict each of the project phases without depicting the tasks subordinate to the project phases, wherein the phase timeline bars display a span from a display of a start date to a display of an end date for each phase, wherein the display of the start date for the phase timeline bars in the second bar chart window pane is graphically aligned in the displayed timeframe with a display of an earliest start date for any of the tasks subordinate to the project phase in the first bar chart window pane, wherein the display of the end date for the phase timeline bars is graphically aligned in the displayed timeframe with a display of a latest end date of any of the tasks subordinate to the project phase in the first bar chart window pane.

15. The system of claim 14, wherein the project schedule includes a least one milestone date, wherein the at least one milestone date is indicated within the first bar chart window pane, wherein upon receiving a selection of a milestone option within a user interface of the second bar chart window pane, indicating the milestone date within the second bar chart window pane.

16. The system of claim 14, wherein the second bar chart window pane includes a user interface, wherein the user interface includes a comments option for inputting text into the second bar chart window pane independent of any phase timeline bar, wherein upon receiving a comment in the user interface, text of the comment is displayed in the second bar chart window pane independent of any phase timeline bar.

17. The system of claim 16, wherein the display of the text of the comment is associated with a timeframe indicator, independent of any phase timeline bar, that indicates a span of time associated with the text of the comment within the second bar chart window pane.

18. The system of claim 16, wherein the display of the text of the comment is associated with a specific time indicator, independent of any phase timeline bar, that indicates a point in time associated with the text of the comment within the second bar chart window pane.

* * * * *